Jan. 14, 1936.                R. H. PENNEBAKER                2,027,400
                                  OIL FILTER
                            Filed July 14, 1933          3 Sheets-Sheet 1
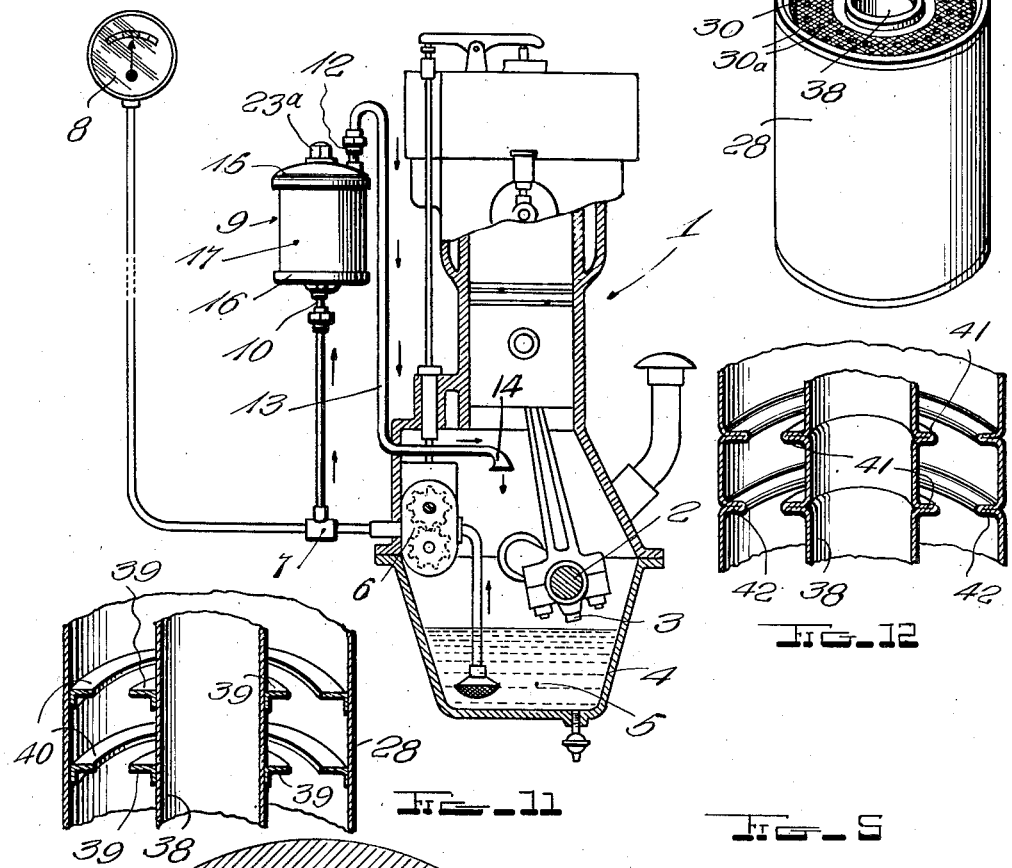
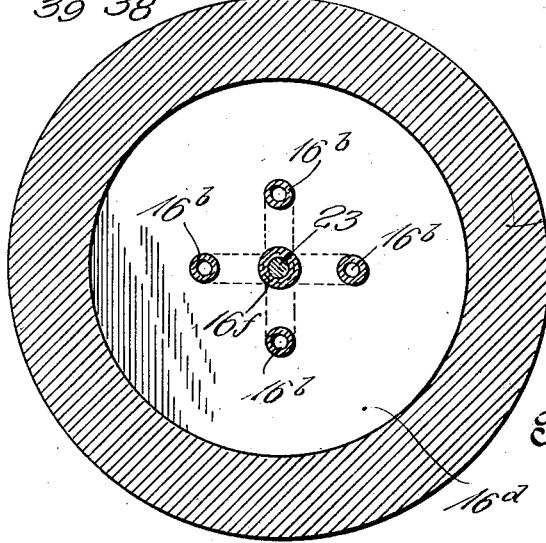
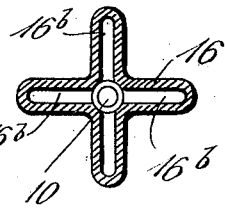
INVENTOR.
Robert H. Pennebaker,
BY
John B. Brody
ATTORNEY.

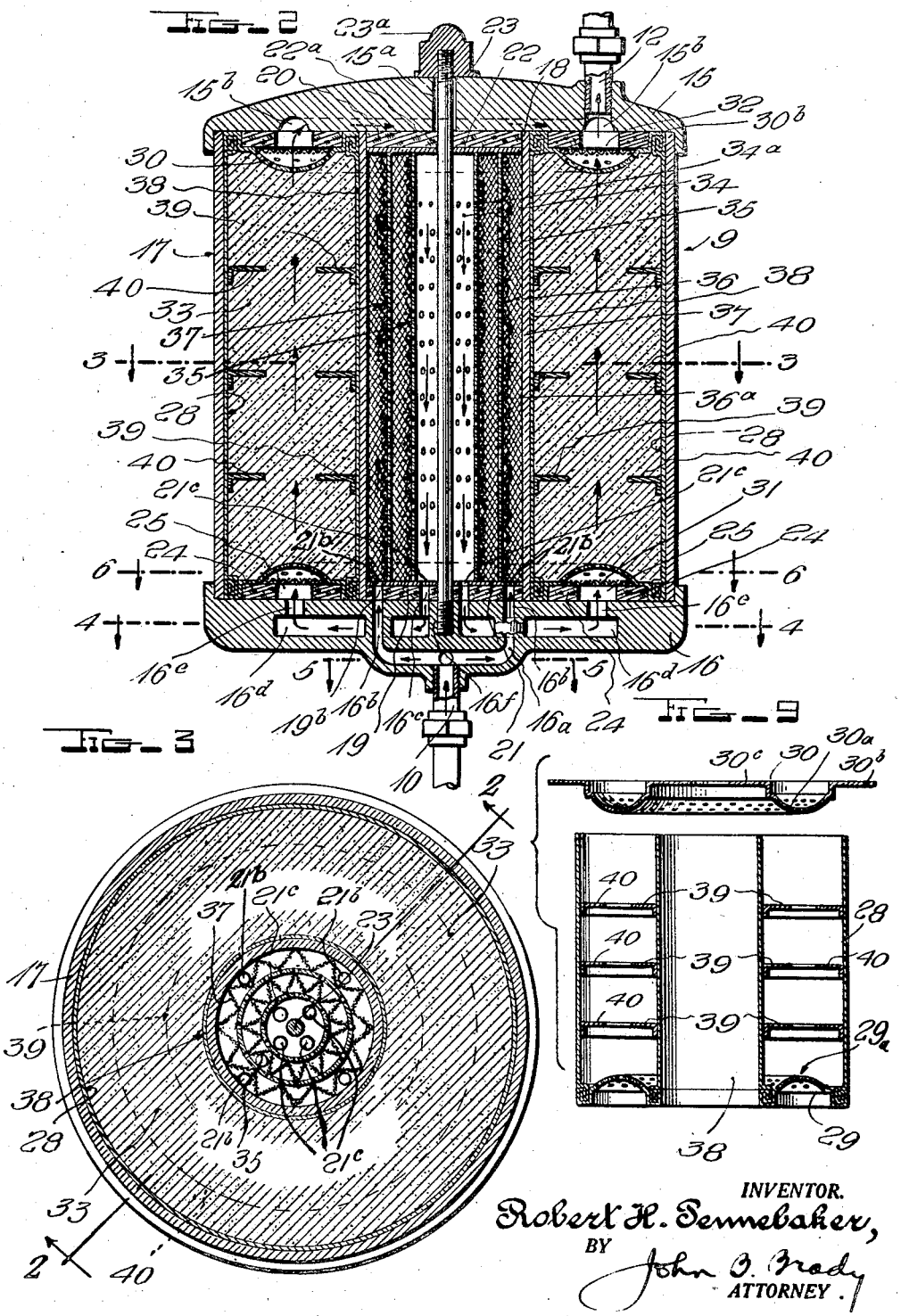

Jan. 14, 1936. R. H. PENNEBAKER 2,027,400
OIL FILTER
Filed July 14, 1933 3 Sheets-Sheet 3
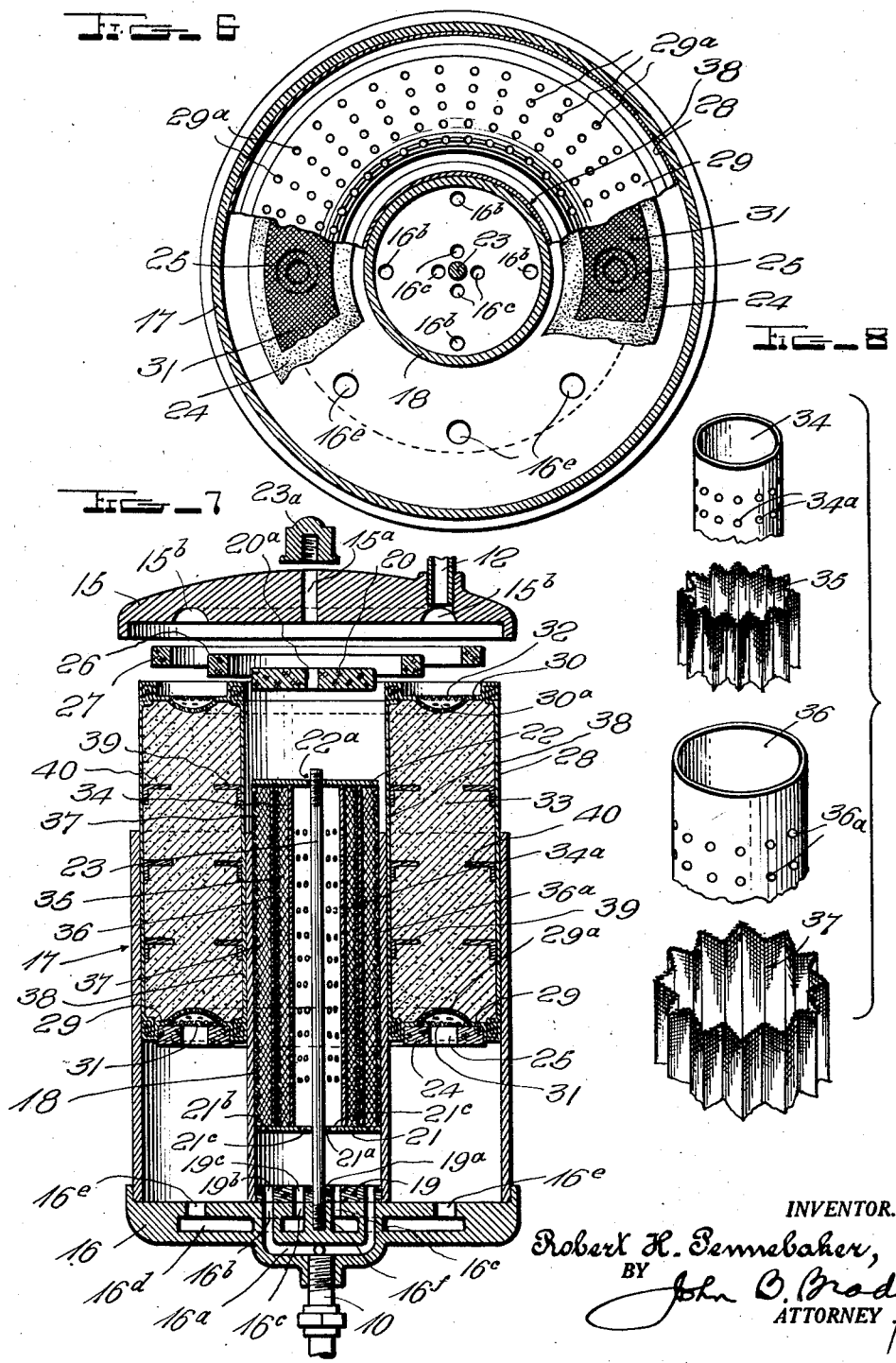
INVENTOR.
Robert H. Pennebaker,
BY John B. Brody
ATTORNEY

Patented Jan. 14, 1936

2,027,400

UNITED STATES PATENT OFFICE 2,027,400

OIL FILTER

Robert H. Pennebaker, New Orleans, La.

Application July 14, 1933, Serial No. 680,497

14 Claims. (Cl. 210—135)

My invention relates broadly to oil filters and more particularly to an improved construction of oil filter which is adaptable for installation in association with an internal combustion engine for filtering the oil in the course of the lubrication cycle for extending the useful life of the lubricant.

One of the objects of my invention is to provide a practical construction of oil filter for internal combustion engines in which the combined filtering effects of a filter clay and a multiplicity of filter screens and perforated partition members are employed for removing matter from the lubricant which tends to impair the lubricating properties thereof for insuring the continuous re-circulation of the lubricant over a relatively long active life.

Another object of my invention is to provide a construction of oil filter particularly adapted for installation on automobiles wherein a renewable filter unit is provided and which is replaceable from time to time for insuring a thorough filtering of the lubricant in the course of the circulation thereof thereby extending the effective life of the lubricant.

Still another object of my invention is to provide an oil filter for the lubricating system of an automobile engine in which a multiplicity of filtering screens are disposed in angular zones within the filter surrounded by a toroidal shaped container for filter clay adapted to act upon the oil subsequent to the filtering operation performed by the several screens for insuring the extraction of such foreign matter from the oil which tends to impair the lubricating properties thereof.

A further object of my invention is to provide a construction of oil filter which contains a multiplicity of filter screens disposed centrally therethrough of and a removable section containing filter clay surrounding the centrally disposed screens and having oil passages for directing lubricant through the screens and filter clay for effecting by the coaction thereof a thorough filtering operation on the lubricant which is circulated therethrough.

Other and further objects of my invention reside in the renewable unit filter structure for lubricating oil as set forth more fully in the specification hereinafter following by reference to the accompanying drawings, in which:

Figure 1 is a diagrammatic illustration of a conventional design of an internal combustion engine showing the application of my improved oil filter; Fig. 2 is a central vertical longitudinal sectional view taken through the filter of my invention on an enlarged scale; Fig. 3 is a horizontal sectional view taken on line 3—3 of Fig. 2; Fig. 4 is a horizontal sectional view taken on line 4—4 of Fig. 2; Fig. 5 is a horizontal sectional view taken on line 5—5 of Fig. 2; Fig. 6 is a horizontal sectional view taken substantially on lines 6—6 of Fig. 2, the oil screens in the center being omitted to avoid confusion; Fig. 7 is a central vertical longitudinal sectional view showing the improved oil filter in the process of assembly; Fig. 8 is a perspective view of a portion of the angularly disposed cylindrical screens and the foraminated stiffening cylinders interposed between them; Fig. 9 is a sectional view of the renewable closure cap container which contains the filter clay showing the top closure cap in juxtaposition to the container previous to being rolled in position and soldered; Fig. 10 is a perspective view of the removable filter cartridge employed in the oil filter of my invention; Fig. 11 is a fragmentary sectional view through the filter cartridge showing one construction of the baffle plates which I may employ in the filter cartridge to prevent oil from seeping along the walls of the filter cartridge without passing through the filter clay; and Fig. 12 shows a modified form of construction for the baffle plates in the filter cartridge of my invention.

The filter of my invention has been developed with a view of rendering the use of lubricant in automobile systems more economical and to avoid the waste which often occurs in the adding of fresh oil to oil which has been previously used in the crank case for a certain period of time. By use of the filter of my invention the lubricant is continuously subjected to an extracting or refining action for excluding from the oil foreign matter which tends to impair the lubricating properties of the oil. I provide a construction of filter which is relatively small in its dimension and which may be readily opened to permit the removal of a filter clay unit for the replacement of a fresh filter clay unit for thereby extending the effective life of the filter. The filter construction of my invention comprises a casing constituted by a pair of opposed heads, one of which includes a manifold system and the other of which includes a passage for oil. Centrally of the heads I provide a multiplicity of foraminated cylindrical members between which I arrange angularly disposed screens forming at least two independent annular filtering zones. The filtering screens are surrounded by a solid cylindrical wall structure which is arranged to receive a toroidal shaped cylindrical casing. The cylindrical casing is removable from the casing of the filter and provides a unit within which filter clay is deposited. The opposite ends of the removable unit are provided with annular zones of perforations over which a fine mesh screen extends. One of the perforated ends of the removable unit is adapted to register with the manifold system in the lower head of the filter while the other perforated end of the movable unit registers with the annular passage in the upper head. The oil which is pumped from the crank case is delivered to the outside annular screen-like zone in the central portion of the filter and is directed through the inner screen-like zone and foraminated cylinders therebetween to a position substantially central of the lower head of the filter from which position the oil is distributed through the manifold to the lower perforated end of the filter unit from which the oil seeps through the filter clay and is discharged through the upper perforated end of the filter unit and delivered to the annular passage in the upper head from which the oil is returned to the bearings or crank case.

The removable filter unit which contains the filter clay is inexpensive in its constructon and may be renewed from time to time for insuring the proper cleaning of the oil in the course of the circulation thereof. The angularly disposed screens and foraminated cylinders are also readily removable for cleaning and replacement for insuring the thorough extraction of foreign matter from the oil. By use of the filter of my invention minute filings and metallic chips which are often released from moving parts of the engine are thoroughly removed from the oil for avoiding the disastrous effect that such fine particles have in the destruction of bearings forming part of the moving structure of the engine which must be continuously lubricated.

Referring to the drawings in more detail, reference character 1 diagrammatically represents an internal combustion engine to which the filter of my invention is applied. Reference character 2 indicates the crank shaft of the internal combustion engine equipped with the usual spoons 3, which serve as the oil pickup for the crank shaft. The crank case is designated by reference character 4 serving as a reservoir for the oil indicated at 5. Reference character 6 designates the oil circulating pump which pumps the oil 5 from crank case 4 through T connection 7 and delivers the oil to the inlet pipe 10 of the filters 9 of my invention and also to the oil circulating gauge 8, which, in the case of an automobile engine, is located on the dash board of the automobile. The outlet from the oil filter is designated at 12 connected to the oil return pipe 13 and through the oil discharge spout 14 which serves to direct the refined or cleaned lubricant into the crank case or bearings of the engine within the crank case as shown. The structure of the filter 9 is shown more clearly in Figs. 2 and 7 wherein reference character 15 represents the upper head provided with a central aperture 15a and an annular oil discharge passage 15b. The lower head for the filter is represented at 16 and includes an oil distribution inlet manifold 16a connected with the inlet pipe 10 by which the oil to be cleaned or clarified is delivered to the oil inlet passages 16b. The lower head 16 also contains oil discharge passages 16c arranged adjacent the center thereof as shown and connected with the oil discharge and distribution manifold 16d in the head 16. The oil discharge and distribution manifold 16d is connected by means of passages 16e with the annular zone which surrounds the central screen structure and in which the removable filter clay unit is mounted. The head 16 contains a screw threaded socket 16f at the center thereof which is adapted to receive the screw threaded end of the connecting rod 23 as shown. The external casing for the filter structure is designated at 17 and extends between the upper and lower heads 15 and 16 and is secured therebetween by connecting rod 23. The connecting rod 23 is screw threaded at one end into the screw threaded socket 16f and at the other end thereof the connecting rod passes through central aperture 16a in head 15 and is engaged by securing nut 23a as shown. The filter structure includes an inner cylinder 18 in the base of which, and directly in contact with the upper surface of the lower head 16, I provide a gasket 19. I employ cork gaskets throughout the filter structure. The gasket 19 is provided with the necessary apertures to allow the circulation of the oil and to permit the passage of the connecting rod 23. That is to say, a central aperture 19a is provided in gasket 19 for the passage of connecting rod 23. Oil inlet ports 19b are provided at symmetrically spaced intervals adjacent the outside of the gasket 19. Oil discharge ports 19c are provided adjacent the inner portion of the gasket 19. The upper gasket 20, which is formed from cork, is disposed between the lower face of the upper head 15 and the upper circular plate 22. The gasket 20 which is formed from cork has a central aperture 20a through which the connecting rod 23 extends. The lower circular plate 21 is disposed within the inner cylinder 18 and rests upon the top of the cork gasket 19. The lower circular plate 21 and the upper circular plate 22 are centrally apertured at 21a and 22a respectively and provide aligned passages for the connecting rod 23. The lower circular plate 21 is provided with oil inlet ports 21a symmetrically arranged adjacent the external periphery of the lower circular plate and aligned with the apertures 19b in gasket 19 as well as oil inlet passages 16b in head 16. The circular plate 21 is also provided with discharge ports 21c symmetrically disposed about the center of the circular plate and aligned with the discharge ports 19c in gasket 19 and the oil discharge passages 16c in the head 16. The upper and lower circular plates 21 and 22 serve as supports for the concentrically disposed foraminated cylinders which include the inner perforated cylinder 34 and the intermediate perforated cylinder 36 with the inner angularly disposed screen 35 located therebetween and the outer angularly disposed screen 37 disposed between the inner cylinder 18 and the intermediate perforated cylinder 36. The alternately disposed perforated cylinders and angularly disposed screens 34, 35, 36, and 37 form a nested or telescopic arrangement in which any one of the members constituting the assembly may be removed and renewed. Cylinder 34 is provided with perforations 34a distributed uniformly about the surface thereof. Cylinder 36 is provided with perforations 36a distributed uniformly about the surface thereof to enable the free passage of the oil between the annular filter zones constituted by the angularly disposed screens.

I provide a toroidal shaped gasket 24 adapted to be seated in the annular space intermediate the cylindrical casing 17 and the inner cylinder 18. The gasket 24 is provided with symmetrically arranged apertures 25 as shown more clearly in Fig. 6, which are adapted to be aligned with the oil discharge passages 16e in the head 16 for permitting the passage of oil, after being treated by the several screens, into the filter clay unit. The filter clay unit forms a very important part of my invention for this unit is readily removable and renewable for insuring the proper cleaning of the oil. The filter clay unit comprises a removable container 28 which is constructed from sheet metal such as thin tin which may have the upper and lower ends thereof rolled to provide oil tight joints between the upper and lower ends 29 and 30. As shown more clearly in Fig. 9 the upper and lower ends 29 and 30 are originally applied in extended form and the flanged edges thereof spun over to provide an interlocking joint with the side walls of the container. As represented for example by the upper end 30 the external flange 30b is spun over to form a connection with the outside wall of container 28 and the inner flange 30c is spun over to provide a connection with the inner wall of the container 28. A similar connection is provided between the flanges formed on the end 29 in the side walls of the container 28. The end 29 is provided with an inwardly directed annular perforated zone represented at 29a. The upper end 30 is provided with an inwardly directed perforated zone 30a as shown. I provide an annular screen 31 secured over the perforated zone 29a in the lower end of the container 28. A similar annular screen 32 is provided over the annular perforated zone 30a in the upper end 30 of the container 28. These annular screens are of approximately 100 mesh size and thereby prevent the passage of any foreign particles including any particles of the filter clay which I have designated at 33 as located within the container 28. The container 28 is filled with loose ground filter clay designated at 33 which is approximately 40 mesh size. The approximate 100 mesh size screen 32 prevents any foreign matter passing to the outlet 12 of the filter even to the extent of preventing any small particles of clay passing out of the container 28. The filter clay is pulverized to approximately 40 mesh size and disposed in the container 28 and then the head of the container rolled or spun into permanent position forming a cartridge-like complete filter unit which is insertable into the chamber-like casing and which will serve for approximately 10,000 miles of service for efficiently filtering the lubricating oil.

It will be observed that the filter clay container 28 is of uniform construction on each end. This permits a standard unit to be inserted in the filter structure without regard to the upper and lower ends of the container 28 as both ends are identical.

The filter unit is shown in perspective view in Fig. 10 and in which the outer wall 28 is illustrated in concentric relation to the inner wall 38. The annular filter screen 32 is shown on the upper end of the cartridge illustrated in Fig. 10 beneath which the perforations 30a are illustrated in the upper end of the container shown at 30. The concentrically arranged walls of the cartridge are each provided with laterally extending baffle plates as represented in Fig. 11 or in the modified form illustrated in Fig. 12. In the form of the invention illustrated in Fig. 11, baffle plates 39 in the form of flanges are secured around the exterior wall 38. Flanges 40 are secured around the interior of the outside wall 28. The baffle plates may be aligned as shown in Fig. 11 or they may be offset from each other. In the assembly views illustrated in Figs. 2, 3, 7, and 9, the flanges 39 and 40 are shown in alignment but it will be understood that such flanges may be disposed in alternate planes. The flanges provide obstructions to the seepage of the oil longitudinally along the surfaces 38 and 28 and force the oil to take a path through the filter clay thereby effectively filtering the oil.

The flanges may be an integral part of the walls 28 and 38 of the cartridge as shown particularly in Fig. 12. In this arrangement the inner wall 38 is provided with a plurality of spaced crimps 41 projecting outwardly from the inner wall 38 and a plurality of spaced crimps 42 extending inwardly from the outer wall 28. It will be observed that these crimps 41 and 42 are more than corrugations as oil would tend to follow corrugations instead of being directed away from such corrugations and forced to take a path through the filter clay. By making the flanges or crimps 41 or 42 integral with the material of the cartridge, decrease in cost of manufacture of the cartridge may be effected.

I provide a pair of cork gaskets 26 and 27 which are located in the upper recessed end of the container 28. The two gaskets 26 and 27 are seated in the opposite sides of the annular discharge passage 15b and do not impede the circulation of lubricant discharged from the upper perforated end 29a of the container 28 through annular screen 22 to the annular discharge passage 15b and through the outlet 12 to the oil return pipe 13.

It will be observed that the filter structure may be readily disassembled by removing nut 23a from connecting rod 23 and the alternate foraminated cylinders 34 and 36 and angularly disposed screens 35 and 37 removed and cleaned in gasolene or other cleansing fluid to clear the foraminated cylinders and screens from hardened gum, foreign matter or dirt collected thereon during the oil circulating process. The filter clay container 28 may be readily inspected and if it is found that the filter clay has become saturated with foreign matter, dirt and material tending to impair the lubricating qualities of the oil, this filter unit may be thrown away and a fresh filter unit inserted and the filter structure readily reassembled.

I have found that the filter unit of my invention increases the economical use of oil and improves the operating efficiency of the internal combustion engine by improved lubrication. I have described my invention princinpally in connection with internal combustion engines for automobiles, but I desire that it be understood that my invention is equally applicable to all classes of internal combustion engines including engines of the stationary type.

While I have described my invention in one of its preferred embodiments I desire that it be understood that modifications may be made in the structure of the filter by those skilled in the art without departing from the spirit of my invention and I intend no limitations upon my invention other than are imposed by the scope of the appended claims.

What I claim as new and desire to secure by Letters Patent of the United States is as follows:

1. An oil filter comprising a cylindrical casing, removable heads at opposite ends of said casing, an oil inlet connection extending through one of said heads, an oil discharge connection extending through the other of said heads, a multiplicity of filter screens, an annular shaped cylindrical filter container concentrically insertable in said casing between said heads, said container enclosing a mass of filter clay and having symmetrical perforate end portions, means for passing oil through the screens and thereafter longitudinally through the filter clay in a series path, and baffle means disposed throughout said filter clay for effecting maximum passage of the oil through said filter clay.

2. An oil filter comprising a cylindrical casing, removable heads at opposite ends of said casing an oil inlet connection extending through one of said heads, an oil discharge connection extending through the other of said heads, a multiplicity of annular filter screens disposed between said heads and centrally of said casing, an annular shaped filter container removably and reversibly insertable in said casing around said filter screens, said filter container enclosing a mass of filter clay and having symmetrical perforate end portions and fluid conducting means for effecting the circulation of oil longitudinally through said filter clay container in the course of the passage of the oil through said filter screens and between said inlet and discharge connections.

3. An oil filter comprising a casing including a pair of concentrically disposed cylindrical members and a pair of removable heads connectible therewith, an oil inlet connection in one of said heads, an oil discharge connection in the other of said heads, a screen-like first filter unit disposed within the inner one of said cylindrical members, and a removable filter clay second filter unit disposed between said cylindrical members, and fluid conducting means including said inner cylindrical member for circulating oil radially through said first filter unit and longitudinally through said second unit between said oil inlet and said oil discharge connections.

4. An oil filter comprising a casing constituted by an inner cylindrical member and an outer cylindrical member, a pair of removable heads engaging said cylindrical members, an oil inlet connection in one of said heads, an oil discharge connection in the other of said heads, a screen-like filter disposed within said inner cylindrical member, a removable filter clay canister disposed within said outer cylindrical member, said filter clay canister having perforated end portions thereon for the circulation of oil therethrough, and means for directing oil from said oil inlet connection through said screen-like filter and through said filter clay canister to said oil discharge connection.

5. An oil filter comprising a casing including a pair of concentrically disposed inner and outer tubular members, a removable head for each end of said tubular members, an oil inlet connection in one of said removable heads, an oil discharge connection in the other of said removable heads, a filter comprising alternately disposed foraminated cylinders and screen-like members disposed within the inner tubular member, a removable filter clay canister insertable within the outer tubular member, said filter clay canister having perforated end portions thereon and enclosing a mass of filter clay, and means for directing oil from said oil inlet through said alternately disposed foraminated cylinders and screen-like members disposed within the inner tubular members and through said filter clay unit in succession to said oil discharge connection.

6. An oil filter comprising a casing including inner and outer concentrically disposed tubular members and removable heads enclosing opposite ends of said tubular members, an oil inlet connection in one of said heads, an oil discharge connection in the other of said heads, oil passages in said first mentioned head extending from the oil inlet connection to positions adjacent the interior wall of said inner tubular member, oil discharge passages in the said head located adjacent the center of said inner tubular member, oil distribution passages extending from said oil discharge passages into said head to discharge positions within said outer tubular member, a screen-like filter disposed within said inner tubular member in a path between the oil inlet and discharge passages in the said head, and a removable filter clay unit insertable within said outer tubular member in a path between the said oil discharge passages in one of said heads and the oil discharge connection in the other of said heads, whereby said screen-like filter and said filter clay unit successively operate upon the oil circulated between said oil inlet and discharge connections.

7. An oil filter comprising a cylindrical casing, a removable head on each end of said casing, an oil inlet connection in one of said heads, an oil discharge connection in the other of said heads, a multiplicity of primary filter screens, a removable annular shaped filter container insertable into and removable from said casing in concentric relation to said filter screens, said filter container being symmetrical on each end thereof and having perforated end portions adapted to be aligned with oil inlet and discharge passages in the said heads, a mass of filter clay comprising a secondary filter within said container, oil conducting means whereby the oil passes said primary filter screens centrally of said annular shaped filter container and subsequently passes longitudinally through said container, and a coupling member extending between said heads for maintaining the aforesaid filter container and filter screens in assembled relation.

8. In an oil filter, a cylindrical casing, oil inlet and discharge connections for said casing, a plurality of primary filter screens, disposed centrally with respect to said casing, and a secondary filter cartridge separately and reversibly insertable into and removable from said casing concentric with respect to said primary filter screens, said secondary filter cartridge being symmetrical on each end thereof and having perforated end portions, a filler of filter clay for said filter cartridge, and screen-like members extending over the perforated ends of said filter cartridge for preventing the seepage of filter clay from said cartridge, and means for conducting the oil through said filter screens and longitudinally through said filter cartridge between said oil inlet and said oil outlet.

9. An oil filter comprising a casing, oil inlet and discharge connections for said casing, a first filter unit within said casing comprising alternately disposed screen-like members and foraminated cylinders, each of said screen-like members comprising angularly disposed sections extending in different directions, a second filter unit comprising a removable filter cartridge having a filler of filter clay and disposed in concentric relation with said first mentioned filter unit, said filter units being disposed in series in the path of circulating oil between said oil inlet and discharge connections and fluid conductive means for effecting the radial circulation of oil through said first filter unit and the longitudinal circulation of oil through said second filter unit.

10. In an oil filter, a casing, oil inlet and discharge connections for said casing, a plurality of primary filter screens and a secondary filter cartridge separately insertable into and removable from said casing, said secondary filter cartridge being symmetrical on each end thereof and having perforated end portions and radially disposed baffle plates arranged in spaced relation along the inner sides of said filter cartridge, and a filler of filter clay for said filter cartridge.

11. In an oil filter, a casing, oil inlet and discharge connections for said casing, a plurality of primary filter screens, and a secondary filter cartridge separately insertable into and removable from said casing, said secondary filter cartridge being symmetrical on each end thereof and having perforated end portions and radially disposed baffle walls integral with and arranged in spaced relation along the inner sides of said filter cartridge, and a filler of filter clay for said filter cartridge.

12. In an oil filter, a casing, oil inlet and discharge connections for said casing, a plurality of primary filter screens, and a secondary filter cartridge separately insertable into and removable from said casing, said secondary filter cartridge being symmetrical on each end thereof and having perforated end portions, a filler of filter clay for said filter cartridge, said filter cartridge having means disposed throughout said filter clay for effecting definite passage of the oil through said filter clay and preventing seepage of the oil along the interior walls of the filter cartridge.

13. An oil filter comprising a casing, a removable head on each end of said casing, an oil inlet connection extending through one of said heads, an oil discharge connection extending through the other of said heads, a multiplicity of filter screens, and a removable canister reversibly insertable into said casing between said heads in concentric relation to said screens, a cylindrical member disposed between said filter screens and said canister, said canister enclosing a mass of filter clay and having perforated end portions thereon, oil passages in said heads aligned with the perforated end portions on said cannister, one of said oil passages communicating with said oil discharge connection, the others of said passages formed in the other of said heads and communicating with the space within said cylindrical member, additional, oil passages connecting said space with said inlet connection, said filter screens being disposed within said space in a position such that oil circulating through said passages passes through said screens, said oil subsequently passing longitudinally through said cannister for effecting complete extraction of foreign matter from said oil.

14. In an oil filter, a casing, a pair of filter sections concentrically disposed and removable from said casing, one of said filter sections being of screen-like construction and the other of said filter sections comprising a renewable filter clay unit having symmetrical perforate end portions and being reversibly insertable into said casing, and means for directing the oil through said screen-like filter section and subsequently longitudinally through said filter clay unit.

ROBERT H. PENNEBAKER.